US006372348B1

(12) United States Patent
Hanejko et al.

(10) Patent No.: US 6,372,348 B1
(45) Date of Patent: Apr. 16, 2002

(54) ANNEALABLE INSULATED METAL-BASED POWDER PARTICLES

(75) Inventors: Francis G. Hanejko, Marlton; George Ellis, Medford, both of NJ (US)

(73) Assignee: Hoeganaes Corporation, Cinnaminson, NJ (US)

( * ) Notice: Subject to any disclaimer, the term of this patent is extended or adjusted under 35 U.S.C. 154(b) by 0 days.

(21) Appl. No.: 09/198,311

(22) Filed: Nov. 23, 1998

(51) Int. Cl.[7] .................................................. B32B 5/16
(52) U.S. Cl. ....................................................... 428/407
(58) Field of Search .................................. 428/403, 407

(56) References Cited

U.S. PATENT DOCUMENTS

| | | | | | |
|---|---|---|---|---|---|
| 1,789,477 | A | | 1/1931 | Roseby | |
| 1,850,181 | A | | 3/1932 | Roseby | |
| 2,783,208 | A | | 2/1957 | Katz | 252/62.5 |
| 3,232,352 | A | | 2/1966 | Bergman | 172/42 |
| 3,933,536 | A | | 1/1976 | Doser et al. | 148/105 |
| 3,935,340 | A | | 1/1976 | Yamaguchi et al. | 427/216 |
| 4,601,865 | A | | 7/1986 | Soileau et al. | 148/104 |
| 4,834,800 | A | | 5/1989 | Semel | 106/403 |
| 4,927,473 | A | | 5/1990 | Ochiai et al. | 148/306 |
| 4,975,333 | A | | 12/1990 | Johnson et al. | 428/570 |
| 5,063,011 | A | | 11/1991 | Rutz et al. | 264/126 |
| 5,080,712 | A | | 1/1992 | James et al. | 75/229 |
| 5,100,604 | A | | 3/1992 | Yamashita et al. | 264/115 |
| 5,108,493 | A | | 4/1992 | Causton | 75/255 |
| 5,112,801 | A | | 5/1992 | Nellis et al. | 505/1 |
| 5,154,881 | A | | 10/1992 | Rutz et al. | 419/37 |
| 5,198,137 | A | | 3/1993 | Rutz et al. | 252/62.54 |
| 5,211,896 | A | * | 5/1993 | Ward et al. | 264/126 |
| 5,225,459 | A | | 7/1993 | Oliver et al. | 523/220 |
| 5,232,610 | A | | 8/1993 | McLaughlin | 249/134 |
| 5,240,742 | A | | 8/1993 | Johnson et al. | 427/216 |
| 5,268,140 | A | | 12/1993 | Rutz et al. | 419/54 |
| 5,290,336 | A | | 3/1994 | Luk | 75/231 |
| 5,298,055 | A | | 3/1994 | Semel et al. | 75/252 |
| 5,306,524 | A | | 4/1994 | Rutz et al. | 427/216 |
| 5,321,060 | A | | 6/1994 | Oliver et al. | 523/220 |
| 5,368,630 | A | | 11/1994 | Luk | 75/252 |
| 5,429,792 | A | | 7/1995 | Luk | 419/36 |
| 5,484,469 | A | | 1/1996 | Rutz et al. | 75/252 |
| 5,543,173 | A | | 8/1996 | Horn, Jr. et al. | 427/212 |
| 5,543,174 | A | | 8/1996 | Rutz | 427/213 |
| 5,595,609 | A | * | 1/1997 | Gay | 148/104 |
| 5,767,426 | A | * | 6/1998 | Oliver et al. | 75/246 |
| 5,798,439 | A | * | 8/1998 | Lefebvre et al. | 528/489 |
| 6,126,715 | A | * | 10/2000 | Luk | 75/351 |

* cited by examiner

*Primary Examiner*—Hoa T. Le
(74) *Attorney, Agent, or Firm*—Woodcock Washburn LLP

(57) ABSTRACT

Annealable insulated metal-based powder particles and methods of preparing and using the same are provided. The insulated metal-based powder particles are formed from metal-based core particles that are coated with an annealable insulating material. The annealable insulating material has at least one inorganic compound and at least one organic polymeric resin. The inorganic compound in the insulating material forms a nonporous insulating layer surrounding the metal-based core particles upon heating. The organic polymeric resin preferably aids in dispersing or binding the inorganic compound to the metal-based core particles prior to annealing. The insulated metal-based powder particles produced can be formed into core components that can be annealed to improve the magnetic performance of the core component. The core components produced are particularly useful under AC operating conditions of 500 Hz or lower.

17 Claims, 2 Drawing Sheets

ANNEALABLE INSULATED METAL-BASED POWDER PARTICLES

FIELD OF THE INVENTION

The present invention relates to insulated metal-based powder particles that can be annealed to temperatures of 480° C. or higher. The present invention also relates to methods of making the annealable insulated metal-based powder particles and methods of making core components from the insulated metal-based powder particles. The core components produced therefrom are particularly useful for low frequency alternating current applications.

BACKGROUND OF THE INVENTION

Insulated metal-based powders have previously been used to prepare core components. Such core components are used, for example, in electrical/magnetic energy conversion devices such as generators and transformers. Important characteristics of core component are its magnetic permeability and core loss characteristics. The magnetic permeability of a material is an indication of its ability to become magnetized, or its ability to carry a magnetic flux. Permeability is defined as the ratio of the induced magnetic flux to the magnetizing force or field intensity. Core loss, which is an energy loss, occurs when a magnetic material is exposed to a rapidly varying field. The core losses are commonly divided into two categories: hysteresis and eddy-current losses. The hysteresis loss is brought about by the necessary expenditure of energy to overcome the retained magnetic forces within the metal-based core component. The eddy-current loss is brought about by the production of electric currents in the metal based core component due to the changing flux caused by alternating current (AC) conditions.

One consideration in the manufacture of core components from powder materials is that the insulated metal powder needs to be suited for molding. For example, it is desirable for the insulated metal powder to be easily molded into a high density component, having a high pressed strength. These characteristics also improve the magnetic performance of the magnetic core component. It is also desirable that the core component so formed be easily ejected from the molding equipment.

Various insulating materials have been tested as coatings for metal-based powder particles. For example, U.S. Pat. No. 3,933,536 to Doser et al. discloses epoxy-type systems, and magnetic particles coated with resin binders; and U.S. Pat. No. 3,935,340 to Yamaguchi et al. discloses plastic-coated metal powders for use in forming conductive plastic-molded articles and pressed powder magnetic cores. U.S. Pat. No. 5,198,137 to Rutz et al., discloses an iron powder composition where the iron powder is coated with a thermoplastic material and admixed with boron nitride powder. The boron nitride reduces the stripping and sliding die injection pressures during molding at elevated temperatures and also improves magnetic permeability.

A further improvement in insulated metal-based powder particles has been the development of "doubly coated metal-based powder particles." For example, U.S. Pat. No. 4,601,765, to Soileau et al. discloses iron particles that are first coated with an inorganic insulating material, for example, an alkaline metal silicate, and then overcoated with a polymer layer. Similar doubly-coated particles are disclosed in U.S. Pat. Nos. 1,850,181 and 1,789,477, both to Roseby. The Roseby particles are treated with phosphoric acid prior to molding the particles into magnetic cores. A varnish is used as a binder during the molding operation and acts as a partial insulating layer. Other doubly-coated particles which are first treated with phosphoric acid are disclosed in U.S. Pat. No. 2,783,208, Katz, and U.S. Pat. No. 3,232,352, Verweij. In both the Katz and Verweij disclosures, a thermosetting phenolic material is utilized during molding to form an insulating binder. More recently, U.S. Pat. No. 5,063,011 to Rutz et al., discloses polymer-coated iron particles where the iron particles are first treated with phosphoric acid and then coated with a polyethersulfone or a polyetherimide.

An improvement in the processing of metal-based powder particles to form core components is disclosed in U.S. Pat. No. 5,268,140 to Rutz et al. In the '140 patent, iron-based particles are coated with a thermoplastic material and compacted under heat and pressure to form a core component. The component produced is subsequently heat treated at a temperature above the glass transition temperature of the thermoplastic material to improve the strength of the core component.

Despite the advantages of producing core components from the aforementioned insulated metal-based powder particles, in AC applications, the magnetic core components can have significant core losses at low frequencies of about 500 Hz or less. These core losses are due to coercive forces that are produced or increased during the compressing (e.g., cold working) of the insulated metal-based powder particles. The coercive force of a magnetic core component is the magnetic force needed to overcome magnetic forces that were retained when the magnetic core component was exposed to a magnetic field. In addition to increased coercive forces, the cold working of the metal-based powder particles during compression can also reduce the permeability of the magnetic core component.

One way to reduce coercive forces (resulting in core losses), and to increase the permeability of a core component, is to subject the core component to temperatures of at least about 480° C. (hereinafter referred to as "high temperature annealing"). By performing such high temperature annealing, core losses are reduced by decreasing the coercive forces of the magnetic core component. This reduction in coercive force results from a "recovery process" whereby metal lattices in the metal powder that are strained during compression recover their physical and mechanical properties prior to compression. High temperature annealing also has the benefit of increasing the strength of the core component without having to add additional components, such as binders. However, for such processes, the insulating material must be one that is not destroyed or decomposed upon exposure to these temperatures.

U.S. Pat. No. 4,927,473 to Ochiai et al., discloses an annealable iron-based powder composition in which the insulating layer on the particles is an inorganic compound or a metal alkoxide. For the inorganic compound, Ochiai teaches the use of materials that have an electronegativity sufficiently larger or smaller than that of iron, so that particles of the inorganic compound can be dispersed on the iron particles by electrostatic forces. However, since such an insulating layer is comprised of discrete inorganic particles attached to the iron particles, it is not "fully protective" or continuous.

Thus, there is a need for an insulating material that can withstand annealing temperatures of at least about 480° C., and that can coat the surfaces of metal-based core particles to form a substantially continuous and nonporous insulating layer surrounding the metal-based core particles. There is also a need for annealable insulated metal-based powder particles that can be compressed into core components having improved magnetic performance under AC or DC operating conditions. There is also a need for core components that have low core losses at frequencies of about 500 Hz or lower.

SUMMARY OF THE INVENTION

The present invention provides annealable insulated metal-based powder particles for forming core components, and methods of making and using the same. The annealable insulated metal-based powder particles comprise the metal-based core particles; and from about 0.001 percent by weight to about 15 percent by weight, based on the weight of the metal-based core particles, of a layer of an annealable insulating material surrounding the metal-based core particles. The annealable insulating material comprises at least one organic polymeric resin and at least one inorganic compound that is converted upon heating to a substantially continuous and nonporous insulating layer that circumferentially surrounds each of the metal-based core particles. Preferably, the inorganic compound is converted to the continuous layer at temperatures of about 480° C. or higher.

The annealable insulated particles are prepared in accordance with the present invention by providing the annealable insulating material in a coatable form, and coating the material onto the metal-based core particles to form a layer of the insulating material surrounding the metal-based core particles.

The annealable insulated metal-based powder particles thus produced can be formed into core components in accordance with the present invention by compacting the annealable insulated particles at conventional pressures to form a core component, heating the core component to form the layer of the annealable insulating material into a substantially continuous and nonporous insulating layer that circumferentially surrounds each of the metal-based core particles, and annealing the core component at a temperature of at least about 480° C. The core components produced are useful in both AC and DC operating conditions, and are particularly useful in low frequency AC applications of 500 Hz or less.

In a preferred embodiment of the present invention, the annealable insulated metal-based powder particles further comprise an inner layer of a preinsulating material located circumferentially between the metal-based core particles and the layer of the annealable insulating material. Preferably, this inner layer of preinsulating material is a phosphorus-iron reaction product, such as iron phosphate. This inner layer of preinsulating material further enhances the performance of the annealable insulated metal-based powder particles in magnetic core components in AC applications.

DETAILED DESCRIPTION OF THE INVENTION

Figure 1:
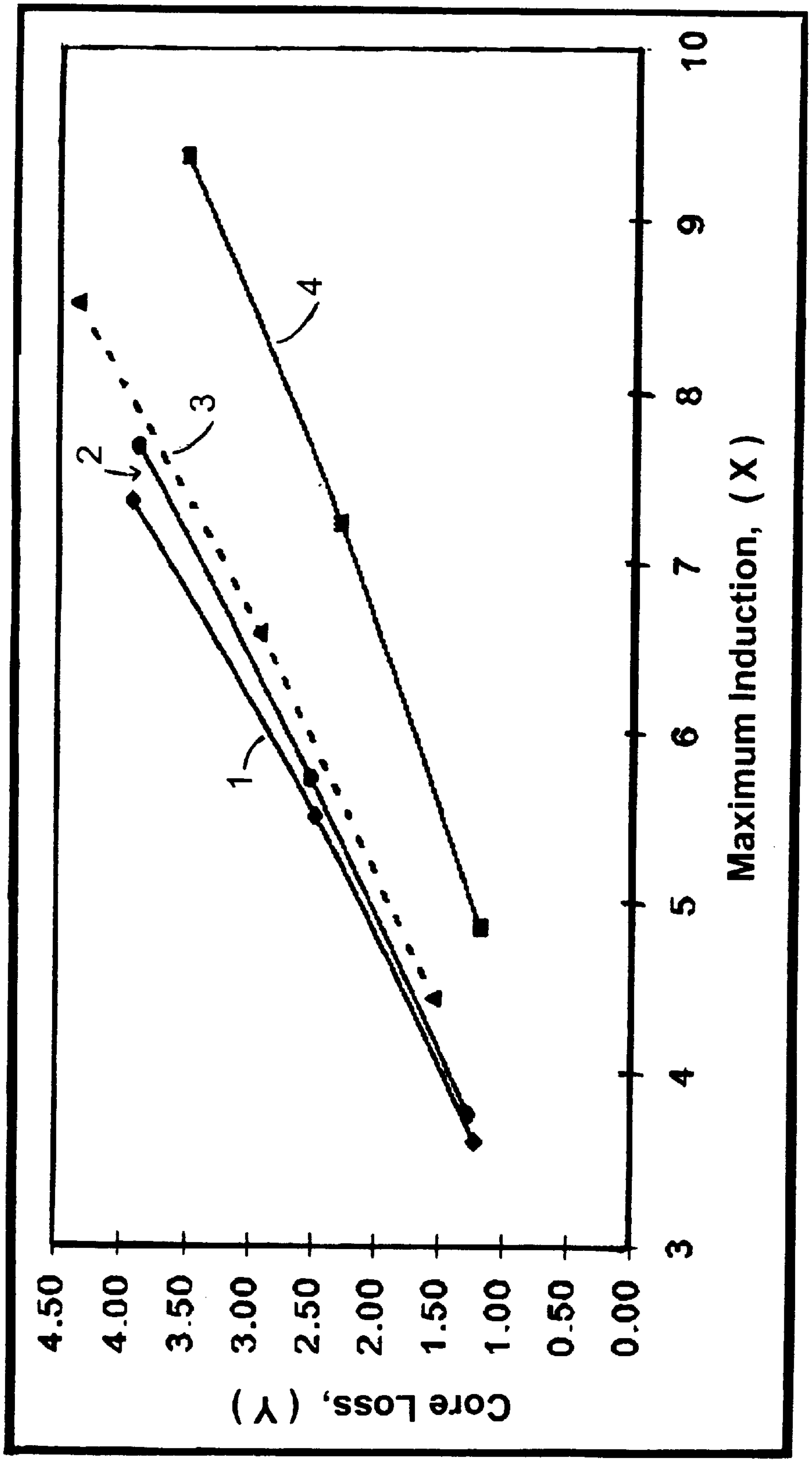
FIG. 1 is a graph showing the effect of various annealing temperatures (Lines 1 through 4) on core loss (Y-axis) as the maximum magnetic induction (X-axis) is varied.

The insulated metal-based powder particles of the present invention comprise metal-based core particles that are coated with a layer of an annealable insulating material that can withstand annealing at temperatures of about 480° C. or greater. In a preferred embodiment of the present invention, the metal-based core particles further contain an inner coating located between the surfaces of the metal-based core particles and the annealable insulating material layer. This inner coating, in addition to providing insulation, helps to clean the surfaces of the metal-based core particles and promotes adhesion of the annealable insulating material layer to the metal-based core particles. The insulated metal-based powder particles formed in accordance with the methods of the present invention can be compressed into core components and annealed at temperatures of about 480° C. or greater. The core components produced are particularly useful in AC applications where the frequency is 500 Hz or less. The core components produced can also be used in DC applications.

The annealable insulating material useful in the present invention contains at least one organic polymeric resin and at least one inorganic compound. The organic polymeric resin enhances the annealable insulating material layer in several ways. For example, the organic polymeric resin aids in maintaining a uniform suspension of the inorganic compound when the annealable insulating material is applied to the metal-based core particles as a solution. Also, for example, the organic polymeric resin aids in uniformly dispersing the inorganic compound about the surfaces of the metal-based core particles to provide a substantially continuous and uniform layer of inorganic compound. The organic polymeric resin additionally serves as a binder to prevent segregation of the insulating layer once applied to the metal-based core particles and to provide "green" strength to the core component prior to annealing. Thus, the organic polymeric resin preferably acts as a dispersing and/or binding agent prior to annealing.

Although the exact mechanism is unknown, it is believed that during annealing, the organic polymeric resin is decomposed (e.g., burned off, oxidized, or removed) while the inorganic compound melts and/or reacts to form an insulating layer that circumferentially surrounds the metal-based core particles. This insulating layer is preferably continuous and nonporous in that each particle is completely covered by a film of the inorganic compound. The insulating layer preferably has a thickness of about 2 microns or less, and more preferably from about 0.5 microns to about 2 microns.

The amount of organic polymeric resin relative to the amount of inorganic compound is generally the amount necessary to effectively disperse the metal-based core particles with the inorganic compound and/or to bind the inorganic compound to the metal-based core particles. Preferably, the organic polymeric resin and inorganic compound are present in a relative weight ratio, polymer-to-inorganic of 0.25:1.0 to 1.5:1.0, and more preferably 0.30:1.0 to 1.0:1.0.

Any organic polymeric resin may be used in the annealable insulating material that is effective in dispersing the inorganic compound circumferentially around the metal-based core particles, or is effective in binding the inorganic compound to the metal-based core particles, or combinations thereof. Preferably, the organic polymeric resin is effective as a binding agent, dispersing agent, or combinations thereof to temperatures of at least about 150° C. or greater and more preferably to temperatures of at least about 250° C. or greater. The organic polymeric resin preferably begins to decompose at a temperature of from about 200° C. or greater, and more preferably at a temperature of from about 250° C. to about 400° C. Suitable organic polymeric resins for use in the annealable insulating material include for example polymeric resins containing alkyds, acrylics, epoxies, or combinations thereof. Preferred organic polymeric resins are alkyds.

The inorganic compound that may be used in the annealable insulating material may be any inorganic oxide, salt, or combinations thereof capable of forming an insulating layer upon being heated. Preferably, the insulating layer is formed during annealing upon exposure to temperatures of at least about 480° C. or greater. In one embodiment, the inorganic compound melts during the annealing process to form an insulating layer. In this embodiment, the inorganic compound preferably has a melting temperature of less than about 800° C., more preferably from about 520° C. to about 800° C., and most preferably from about 500° C. to about 720° C. In another embodiment, the inorganic compound forms an insulating layer by chemically reacting with the metal at the annealing conditions to form the insulating layer. In this embodiment, the inorganic compound preferably reacts at a temperature of less than about 800° C., more preferably from about 520° C. to about 800° C., and most preferably from about 500° C. to about 720° C. It is also possible to have a mixture of inorganic compounds melt and where one or more inorganic compounds react to form the insulating layer. Suitable inorganic compounds include for example alkali or alkaline earth metal oxides or salts, such as $Na_2CO_3$, CaO, $BaO_2$, or $Ba(NO_3)_2$; nonmetal oxides or salts, such as $B_2O_3$, or $SiO_2$; or transition metal salts or oxides, such as $CdCl_2$, or $Al_2O_3$; or any combination thereof.

Preferably, the inorganic material is a mixture of at least two inorganic compounds. In a preferred embodiment, the inorganic material is a mixture of about 5 wt % to 95 wt % $B_2O_3$, and about 95 wt % to 5 wt % $BaO_2$ based on the total weight of the inorganic compound. Most preferably, the inorganic material comprises a mixture of about 65 wt % to 75 wt % $B_2O_3$ and about 25 wt % to 35 wt % $BaO_2$, based on the total weight of the inorganic material.

A particularly preferred annealable insulating material is FERROTECH™ CPN-5 supplied by Ferro Technologies located in Pittsburgh, Pa. FERROTECH CPN-5 is a water-based colloidal suspension containing a polymeric organic resin and a mixture of inorganic compounds. The FERROTECH CPN-5 is supplied as 50 wt % active (i.e., total weight of organic resin and inorganic compound) solution. Upon being exposed to annealing temperatures of at least about 480° C. the FERROTECH CPN-5 coating will form a substantially continuous and nonporous insulating layer.

The annealable insulating material (organic resin and inorganic compound) is generally applied to the metal-based core powders in an amount sufficient to provide a coating of insulating material having a weight of about 0.001 percent to about 15 percent, and more preferably about 0.5 percent to about 10 percent, of the weight of the metal-based core particles.

The metal-based core particles useful in the present invention comprise metal powders of the kind generally used in the powder metallurgy industry, such as iron-based powders and nickel-based powders. The metal-based core particles constitute a major portion of the annealable insulated metal based powder particles, and generally constitute at least about 80 weight percent, preferably at least about 85 weight percent, and more preferably at least about 90 weight percent based on the total weight of the annealable insulated metal-based powder particles.

Examples of "iron-based" powders, as that term is used herein, are powders of substantially pure iron, powders of iron pre-alloyed with other elements (for example, steel-producing elements) that enhance the strength, hardenability, electromagnetic properties, or other desirable properties of the final product, and powders of iron to which such other elements have been diffusion bonded.

Substantially pure iron powders that can be used in the invention are powders of iron containing not more than about 1.0% by weight, preferably no more than about 0.5% by weight, of normal impurities. Examples of such highly compressible, metallurgical-grade iron powders are the ANCORSTEEL 1000 series of pure iron powders, e.g. 1000, 1000B, and 1000C, available from Hoeganaes Corporation, Riverton, N.J. For example, ANCORSTEEL 1000 iron powder, has a typical screen profile of about 22% by weight of the particles below a No. 325 sieve (U.S. series) and about 10% by weight of the particles larger than a No. 100 sieve with the remainder between these two sizes (trace amounts larger than No. 60 sieve). The ANCORSTEEL 1000 powder has an apparent density of from about 2.85–3.00 g/cm3, typically 2.94 g/cm3. Other iron powders that can be used in the invention are typical sponge iron powders, such as Hoeganaes' ANCOR MH-100 powder.

The iron-based powder can incorporate one or more alloying elements that enhance the mechanical or other properties of the final metal part. Such iron-based powders can be powders of iron, preferably substantially pure iron, that has been pre-alloyed with one or more such elements. The pre-alloyed powders can be prepared by making a melt of iron and the desired alloying elements, and then atomizing the melt, whereby the atomized droplets form the powder upon solidification.

Examples of alloying elements that can be pre-alloyed with the iron powder include, but are not limited to, molybdenum, manganese, magnesium, chromium, silicon, copper, nickel, gold, vanadium, columbium (niobium), graphite, phosphorus, aluminum, and combinations thereof. Preferred alloying elements are molybdenum, phosphorus, nickel, silicon or combinations thereof. The amount of the alloying element or elements incorporated depends upon the properties desired in the final metal part. Pre-alloyed iron powders that incorporate such alloying elements are available from Hoeganaes Corp. as part of its ANCORSTEEL line of powders.

A further example of iron-based powders are diffusion-bonded iron-based powders which are particles of substantially pure iron that have a layer or coating of one or more other metals, such as steel-producing elements, diffused into their outer surfaces. Such commercially available powders include DISTALOY 4600A diffusion bonded powder from Hoeganaes Corporation, which contains about 1.8% nickel, about 0.55% molybdenum, and about 1.6% copper, and DISTALOY 4800A diffusion bonded powder from Hoeganaes Corporation, which contains about 4.05% nickel, about 0.55% molybdenum, and about 1.6% copper.

A preferred iron-based powder is of iron pre-alloyed with molybdenum (Mo). The powder is produced by atomizing a melt of substantially pure iron containing from about 0.5 to about 2.5 weight percent Mo. An example of such a powder is Hoeganaes' ANCORSTEEL 85HP steel powder, which contains about 0.85 weight percent Mo, less than about 0.4 weight percent, in total, of such other materials as manganese, chromium, silicon, copper, nickel, molybdenum or aluminum, and less than about 0.02 weight percent carbon. Another example of such a powder is Hoeganaes' ANCORSTEEL 4600V steel powder, which contains about 0.5–0.6 weight percent molybdenum, about 1.5–2.0 weight percent nickel, and about 0.1–0.25 weight percent manganese, and less than about 0.02 weight percent carbon.

Another pre-alloyed iron-based powder that can be used in the invention is disclosed in U.S. Pat. No. 5,108,493, entitled "Steel Powder Admixture Having Distinct Pre-alloyed Powder of Iron Alloys," which is herein incorporated in its entirety. This steel powder composition is an admixture of two different pre-alloyed iron-based powders, one being a pre-alloy of iron with 0.5–2.5 weight percent molybdenum, the other being a pre-alloy of iron with carbon and with at least about 25 weight percent of a transition element component, wherein this component comprises at least one element selected from the group consisting of chromium, manganese, vanadium, and columbium. The admixture is in proportions that provide at least about 0.05 weight percent of the transition element component to the steel powder composition. An example of such a powder is commercially available as Hoeganaes' ANCORSTEEL 41 AB steel powder, which contains about 0.85 weight percent molybdenum, about 1 weight percent nickel, about 0.9 weight percent manganese, about 0.75 weight percent chromium, and about 0.5 weight percent carbon.

Other iron-based powders that are useful in the practice of the invention are ferromagnetic powders. An example is a powder of iron pre-alloyed with small amounts of phosphorus.

The iron-based powders that are useful in the practice of the invention also include stainless steel powders. These stainless steel powders are commercially available in various grades in the Hoeganaes ANCOR® series, such as the ANCOR® 303L, 304L, 316L, 410L, 430L, 434L, and 409Cb powders.

The particles of iron or pre-alloyed iron can have a weight average particle size as small as one micron or below, or up to about 850–1,000 microns, but generally the particles will have a weight average particle size in the range of about 10–500 microns. Preferred are iron or pre-alloyed iron particles having a maximum weight average particle size up to about 350 microns; more preferably the particles will have a weight average particle size in the range of about 20–200 microns, and most preferably 80–150 microns.

The metal powder used in the present invention can also include nickel-based powders. Examples of "nickel-based" powders, as that term is used herein, are powders of substantially pure nickel, and powders of nickel pre-alloyed with other elements that enhance the strength, hardenability, electromagnetic properties, or other desirable properties of the final product. The nickel-based powders can be admixed with any of the alloying powders mentioned previously with respect to the iron-based powders. Examples of nickel-based powders include those commercially available as the Hoeganaes ANCORSPRAY® powders such as the N-70/30 Cu, N-80/20, and N-20 powders.

In a preferred embodiment of the present invention, the insulated metal-based powder particles preferably have an inner layer or coating of a preinsulating material that is located between the metal-based core particle surface and the annealable insulating material. This inner layer, in addition to providing some insulation, preferably helps to clean the surface of the metal-based core particle and promote adhesion of the annealable insulating material layer to the metal-based core particle. This preinsulating material is preferably applied (on a solids basis) in an amount of no greater than about 0.5 weight percent and more preferably from about 0.001 to about 0.2 weight percent, based on the total weight of the metal-based core particles (uncoated).

Suitable preinsulating materials include for example phosphorus-containing compounds capable of reacting with iron, such as iron phosphate disclosed in U.S. Pat. No. 5,063,011 issued November 1991 to Rutz et al, and alkaline metal silicates such as those disclosed in U.S. Pat. No. 4,601,765 issued July 1986 to Soileau et al. The disclosures of these patents are hereby incorporated by reference in their entireties. Other preinsulating materials useful in the present invention include for example surface cleansing acids, such as nitrates, chlorides, halides, or combinations thereof.

Preferably, the inner layer of preinsulation material is formed through a phosphorus-iron chemical reaction. The inner layer may include for example iron phosphate, iron orthophosphate, iron pyrophosphate, iron metaphosphate, and iron polymeric phosphate. To form the inner coating of phosphorus-iron on the metal-based core particles, various phosphating agents that are applied to the metal-based core particles may be used. For example, suitable phosphating agents include phosphoric acid; orthophosphoric acid; pyrophosphoric acid; alkali metal or alkaline earth metal phosphate such as calcium zinc phosphate; transition metal phosphate such as zinc phosphate; or combinations thereof.

The annealable insulated metal-based powder particles of the present invention are preferably prepared in the following manner. The metal-based core particles are first optionally coated with a preinsulating material such as phosphoric acid to form an inner layer or coating such as hydrated iron phosphate at the surface of the metal-based core particles. This treatment step is typically carried out in a mixing vessel where the preinsulating material can be uniformly mixed with the metal-based core particles. Preferably, the preinsulating material is applied onto the metal-based core particles by first being dissolved in a compatible carrier solvent. The preinsulating material in such an embodiment is typically diluted in an amount of about 1 to about 12 parts by weight, and more preferably, from about 5 to about 10 parts by weight carrier solvent per one part by weight preinsulating material. In the case of a phosphating agent such as phosphoric acid, acetone is a preferred carrier solvent.

Following mixing of the preinsulating material and metal-based core particles, the powder is then dried to remove the carrier solvent to form the inner layer of preinsulating material on the core particle surfaces. In the case of phosphoric acid, a layer of hydrated iron phosphate is formed. The powder is then optionally further dried by heating the powder to a desired temperature for a sufficient amount of time to form a hardened or more resistant inner coating. Preferably, this drying step is conducted in an inert atmosphere such as nitrogen, hydrogen or a noble gas such as argon.

Although the desired drying temperature will depend on the preinsulating material, preferably, the powder is heated during the drying step to temperatures ranging from about 35° C. to about 1095° C., and more preferably from about 145° C. to about 370° C. It will also be recognized that the length of the heat treatment will vary inversely with the temperature, but generally the powder can be heated for as little as one minute at the highest temperature to as long as 5 hours at lower temperatures. Preferably the conditions are selected so as to dry the preinsulating material over a 30 to 60 minute period.

When phosphoric acid is used as the phosphating agent to coat iron-based particles, the drying step converts the hydrated layer to a glass-like iron phosphate, which provides good electrical insulation between the particles. The weight, and therefore the thickness, of the phosphate coating can be varied to meet the electrical insulation needs of any given application. For example, under AC operating conditions the metal-based powder particles must be highly insulated to have good magnetic performance, however under DC operating conditions, highly insulated particles can have an adverse effect on permeability. Therefore, it is generally desirable to have a phosphate inner coating under AC operating conditions, but typically not under DC operating conditions.

After the optional inner coating is applied, the metal-based core particles are coated with the annealable insulating material to provide an outer insulating layer. The annealable insulating material is provided in a coatable form. For example, the annealable insulating material may be dissolved or dispersed in a compatible carrier liquid or may be provided in the form of a melt. In a preferred embodiment, the annealable insulating material is dissolved or dispersed in a suitable carrier liquid in an amount of from about 0.30 parts by weight to about 3 parts by weight annealable insulating material per one part by weight carrier liquid.

The annealable insulating material can be applied by any method that results in the formation of a substantially uniform and continuous insulating layer surrounding each of the metal-based core particles. For example, a mixer can be used that is preferably equipped with a nozzle for spraying the insulating material onto the metal-based core particles. Mixers that can be used include for example helical blade mixers, plow blade mixers, continuous screw mixers, cone and screw mixers, or ribbon blender mixers. In a preferred embodiment, the coating of the metal-based core particles is accomplished in a fluidized bed.

In a process using a fluidized bed, any appropriate fluidized bed may be used such as a Würster coater manufactured by Glatt Inc. For example, in a Würster coater, the metal-based core particles are fluidized in air and preferably preheated to a temperature of from about 50° C. to about 100° C., more preferably from about 50° C. to about 85° C. to facilitate the adhesion and subsequent drying of the annealable insulating material. The annealable insulating material is then dissolved in an appropriate carrier liquid (if necessary) to achieve a sprayable solution and sprayed through an atomizing nozzle into the inner portion of the W ürster coater. The solution droplets wet the metal-based core particles, and the liquid is evaporated as the metal-based core particles move into an expansion chamber. Preferably, the temperature of the metal-based core particles in the W ürster coater is maintained in the range from about 50° C. to about 100° C. and more preferably from about 50° C. to about 85° C. to facilitate drying. This process results in a substantially uniform and continuous circumferential coating of the annealable insulating material surrounding the metal-based core particles.

Once the particles have been coated with the annealable insulating material, the particles can be further dried at temperatures ranging from about 100° C. to about 140° C. and more preferably from about 100° C. to about 120° C. This additional drying step is conducted to preferably eliminate any residual carrier liquid.

In a preferred embodiment, FERROTECH CPN-5 material, which is provided as a 50% aqueous suspension of the insulating material is sprayed as is into the Würster coater to coat the fluidized metal-based core particles. The FERROTECH CPN-5 is preferably applied in an amount of from about 3 wt % to about 10 wt % (as is), based on the total weight of the metal-based core particles. The operating temperatures in the Würster coater in this preferred embodiment are preferably in the range of from about 50° C. to about 85° C.

The size of the annealable insulated metal-based powder particles produced will depend on the size of the starting metal-based core particles. In general, when the starting metal-based core particles are about 50 microns to 100 microns in average size, the annealable insulated metal-based powder particles provided in accordance with this invention will have a weight average particle size of about 50 microns to 125 microns. However, larger metal-based core particles as well as metal-based core particles in the micron and submicron range can be insulated by the methods provided in accordance with this invention to provide final powders of greater or less than this range. In any case, methods provided in accordance with this invention produce annealable insulated metal-based powder particles which have a good magnetic permeability.

The insulated metal-based powder particles that are prepared as described above can be formed into core components by appropriate compacting techniques (including molding). In preferred embodiments, the core components are formed in dies using compression molding techniques. In such embodiments, the compacting may be carried out at temperatures ranging from room temperature to about 375° C. Compression pressures may range from about 20 tons per square inch (tsi) to about 70 tsi.

In a preferred compression embodiment, the annealable insulated metal-based powder particles are preheated to a temperature of from about 25° C. to about 200° C., and then charged to a die that has also been preheated to a temperature ranging from about 25° C. to about 260° C. The metal-based powder particles are then compressed at pressures ranging from about 20 tsi to about 70 tsi, and more preferably from about 20 tsi to about 50 tsi. By performing the compression at elevated temperatures, the compacted density of the core components is increased resulting in overall increased magnetic performance.

Injection molding techniques can also be applied to the annealable insulated metal-based powder particles of the present invention to form composite magnetic products. These composite magnetic products can be of complex shapes and can be composed of several different materials. For example, the insulated metal-based powder particles can be molded around components of a finished part such as, for example, magnets, bearings, or shafts. The resulting part is then in a net-shaped form and is as strong as a reinforced version of the same part, but with the added capability of carrying a constant magnetic flux over various frequencies. Generally, metal-based powder particles having a very fine particle size, for example, 10 microns to 100 microns, are used when injection molding will be used to form the core component.

In the preparation of annealable insulated metal-based powder particles intended for use in injection molding, the annealable insulating material and metal-based core particles can be fed, if desired, through a heated screw blender, during the course of which the insulating material is mixed and coated onto the metal-based core particles as the materials are pressed through the screw. The resulting mixture is extruded into pellet form to be fed into the injection molding apparatus.

In any of the various compaction techniques, a lubricant, usually in an amount up to about 1 percent by weight, can be mixed into the powder composition or applied directly on the die or mold wall. Use of the lubricant reduces stripping and sliding pressures. Examples of suitable lubricants are zinc stearate or one of the synthetic waxes available from Glycol Chemical Co. such as ACRAWAX synthetic wax. Other lubricants that can be admixed directly with the powder composition include, for example, particulate boron nitride, molybdenum disulfide, graphite, or combinations thereof.

Following the compaction step, the core component produced is preferably annealed to improve its magnetic performance. As discussed previously, the "cold working" of the metal powder, such as compressing, strains the metal lattices within the powder. This straining increases the coercive force of the powder resulting in increased core losses and reduced permeability of the magnetic core component. This drop in magnetic performance is particularly noticeable at frequencies of about 500 Hz or less. The annealing of the core component at an appropriate temperature "stress relieves" the metal lattices within the powder by restoring the metal lattice's physical and mechanical properties under strain-free conditions, preferably without any recrystallization or grain growth. Thus, the annealing temperature chosen must be at least at a temperature where this stress relief process begins. Moreover, the minimum temperature where this stress relief begins depends upon the amount and type of cold work imparted to the powder. Although, magnetic performance is improved as the annealing temperature is increased, the temperature cannot be so high that the insulating layer surrounding the metal-based core particles is destroyed.

In a preferred embodiment of the present invention, the magnetic component is heated in the annealing step to a process temperature of at least about 480° C., more preferably from about 600° C. to about 900° C., and most preferably from about 600° C. to about 850° C. The core component is maintained at this process temperature for a time sufficient for the component to be thoroughly heated and its internal temperature brought substantially to the process temperature. Generally, heating is required for about 0.5 hours to about 3 hours, more preferably from about 0.5 hours to about 1 hour, depending on the size and initial temperature of the compacted component. The annealing is preferably conducted in an inert atmosphere such as nitrogen, hydrogen, or a noble gas such as argon. Also, the annealing is preferably performed after the magnetic component has been removed from the die.

The annealed core component produced according to the method of the present invention is useful under AC or DC operating conditions. The annealed core component is particularly useful under AC conditions at frequencies of about 500 Hz or less, more preferably about 200 Hz or less, and most preferably from about 55 Hz to about 200 Hz. The annealed core component is also useful under DC operating conditions, particularly when the core component is formed from insulated metal-based powder particles containing no inner coating of preinsulating material.

Some embodiments of the present invention will now be described in detail in the following Examples. Annealable insulated iron-based particles were prepared and formed into core components in accordance with the methods of the present invention. Also, other iron powders were prepared and formed into core components for comparative purposes. The core components formed were evaluated for magnetic properties.

COMPARATIVE EXAMPLES 1–5

ANCORSTEEL® 1000C Iron Powder was treated with 0.035 grams of phosphoric acid per 100 grams of iron powder. The phosphoric acid was applied to the iron powder by dissolving the phosphoric acid in acetone in an amount of 1 part by weight of phosphoric acid per 10 parts by weight acetone, and mixing the phosphoric acid and iron powder in a mixer at a temperature of 25° C. to coat the iron powder with the phosphoric acid.

The phosphate coated iron powder was then mixed with 0.75 weight percent zinc stearate based on the weight of the iron powder and compressed in a compaction device at a temperature of 25° C. to form magnetic toroids. The compressions were conducted at pressures ranging from 10 tons per square inch (tsi)(135 MPa) to 50 tsi (685 MPa). The magnetic toroids formed were removed from the compaction device and heated at 350° F. (177° C.) for 30 minutes in an atmosphere of nitrogen. The magnetic toroids formed had an outer diameter of about 1.5", an inner diameter of about 1.2", and a height of about 0.25", and were evaluated for the following properties: density, coercive force, maximum permeability, and maximum magnetic flux at 40 Oersteds under DC operating conditions. The results are summarized in Table 1 below.

TABLE 1

| Comparative Example No. | Compacting Pressure tsi (MPa)[1] | Density (g/cm$^3$) | Coercive Force (Oe)[2] | Maximum Perm[3] | Bmax @ (Gauss)[4] |
|---|---|---|---|---|---|
| Comp. Ex. 1 | 10 (135) | 5.70 | 3.3 | 97 | 3,300 |
| Comp. Ex. 2 | 20 (270) | 6.47 | 4.1 | 179 | 5,900 |
| Comp. Ex. 3 | 30 (410) | 6.92 | 4.3 | 225 | 7,400 |
| Comp. Ex. 4 | 40 (540) | 7.14 | 4.4 | 245 | 8,200 |
| Comp. Ex. 5 | 50 (685) | 7.26 | 4.4 | 245 | 8,300 |

[1]tsi is tons per square inch; MPa is mega pascal.
[2]Oe is Oersteds.
[3]Perm is permeability.
[4]Bmax is maximum magnetic induction measured in Gauss As the data in Table 1 indicates, compaction pressures ranging from 10 tsi (135 MPa) to 50 tsi (685 MPa) resulted in coercive forces ranging from 3.3 to 4.4 Oersteds. In comparison, for pure iron that is compacted and fully annealed, the coercive force is only about 2.0 Oersteds at an induction level of 12,000 Gauss. Consequently, it is desirable to reduce the coercive force of molded metal-based powder particles.

COMPARATIVE EXAMPLE 6

ANCORSTEEL® 1000C Iron Powder was treated with 0.035 grams of phosphoric acid per 100 grams of iron powder according to the procedure used for Comparative Examples 1 to 5 to form a phosphate coated iron powder. The resulting phosphate iron powder was then coated with 0.75 grams of a thermoplastic polyetherimide per 100 grams of iron powder using a Würster coater according to the procedure described in U.S. Pat. No. 5,268,140, column 5, lines 20 to 41, which is hereby incorporated by reference in its entirety. The polyetherimide used was ULTEM® 1000 grade, supplied by the General Electric Company.

The resulting thermoplastic coated iron powder was heated to a temperature of about 17.5° C., was compacted at a pressure of 50 tsi and a die temperature of 260° C. to form a magnetic toroid. The compaction press used was the same as in Comparative Examples 1 to 5, except that the compression die was preheated to a temperature of 260° C. Following compaction, the magnetic toroid was removed from the press and heat treated at a temperature of 300° C. for 1.5 hours. The magnetic toroid was then evaluated to obtain the DC permeability, DC coercive force, AC coercive force at 60 Hz, and the AC core loss at 60 Hz and 1 Tesla. The results are reported in Table 2.

EXAMPLE 7

ANCORSTEEL® 1000C Iron Powder was treated with 0.03 grams of phosphoric acid per 100 grams of iron powder according to the procedure used for Comparative Examples 1 to 5 to form phosphate coated iron powder. The resulting phosphate iron powder was then coated with 6 grams of FERROTECH™ CPN-5 per 100 grams of iron powder using a Würster coater. The CPN-5 coating was applied by preheating iron powder in the Würster coater to a temperature of 60° C. and then spraying the CPN-5 onto the iron powder while maintaining the temperature at 60° C. After applying the CPN-5, the coated iron powder was dried at a temperature of 120° C. for 1 hour.

The resulting insulated iron particles were then preheated to a temperature of 300° F. (149° C.) and compacted at a pressure of 50 tsi to form a magnetic toroid. The compaction was performed using the press described in Comparative Examples 1 to 5, except that the compression die was preheated to a temperature of 500° F. (260° C.). The magnetic toroid was then evaluated to obtain the DC permeability, DC coercive force, AC coercive force at 60 Hz, and the AC core loss at 60 Hz and 1 Tesla. The results are reported in Table 2.

EXAMPLE 8

ANCORSTEEL® 1000C Iron Powder was coated with 6 grams of FERROTECH® CPN-5 per 100 grams of iron powder using a Würster coater. The CPN-5 coating was applied by preheating iron powder in the Würster coater to a temperature of 60° C. and then spraying the CPN-5 onto the iron powder while maintaining the temperature at 60° C. After applying the CPN-5, the coated iron powder was dried at a temperature of 120° C. for 1 hour.

The resulting insulated iron particles were then preheated to a temperature of 300° F. (149° C.) and compacted at a pressure of 50 tsi to form a magnetic toroid. The compaction was performed using the press described in Comparative Examples 1 to 5, except that the compression die was preheated to a temperature of 500° F. (260° C.). Following compaction, the magnetic toroid was removed from the compaction equipment and was annealed by heating the toroid, in a nitrogen atmosphere, to a temperature of 1200° F. (649° C.) and maintaining the toroid at this temperature for one hour. The magnetic toroid was then evaluated to obtain the DC permeability, DC coercive force, AC coercive force at 60 Hz, and the AC core loss at 60 Hz and 1 Tesla. The results are reported in Table 2.

EXAMPLE 9

ANCORSTEEL® 1000C Iron Powder was treated with 0.03 grams of phosphoric acid per 100 grams of iron powder according to the procedure used for Comparative Examples 1 to 5 to form phosphate coated iron powder. The resulting phosphate iron powder was then coated with 6 grams of FERROTECH™ CPN-5 per 100 grams of iron powder using a Würster coater. The CPN-5 coating was applied by preheating iron powder in the Würster coater to a temperature of 60° C. and then spraying the CPN-5 onto the iron powder while maintaining the temperature at 60° C. After applying the CPN-5, the coated iron powder was dried at a temperature of 120° C. for 1 hour.

The resulting insulated iron particles were then preheated to a temperature of 300° F. (149° C.) and compacted at a pressure of 50 tsi to form a magnetic toroid. The compaction was performed using the press described in Comparative Examples 1 to 5, except that the compression die was preheated to a temperature of 500° F. (260° C.).

Following compaction, the magnetic toroid was removed from the press and annealed. Annealing was conducted by heating the toroid to a temperature 1200° F. (649° C.) in a nitrogen atmosphere and maintaining the toroid at this temperature for one hour. The magnetic toroid was then evaluated to obtain the DC permeability, DC coercive force, AC coercive force at 60 Hz, and the AC core loss at 60 Hz and 1 Tesla. The results are reported in Table 2.

EXAMPLE 10

A magnetic toroid was prepared according to the procedure in Example 9, except that the ANCORSTEEL® 1000C Iron Powder was replaced with an iron powder having a weight average particle size of 840 microns to 1200 microns.

EXAMPLE 11

A magnetic toroid was prepared according to the procedure in Example 9, except that the ANCORSTEEL® 1000C Iron Powder was replaced with an iron-phosphorous alloy powder. The amount of phosphate in the powder was 0.2 wt % based on the total weight of the powder.

EXAMPLE 12

A magnetic toroid was prepared according to the procedure in Example 9, except that the phosphoric acid was replaced with a calcium zinc phosphate solution dissolved in water in an amount of 50 parts by weight calcium zinc phosphate to 50 parts by weight water.

TABLE 2

| Ex. No.[5] | Fe Core Powder | Anneal Temp. (° F.)[6] | Inner Coat[7] | Outer Coat[8] | DC perm | DC Coer. force, (Oe)[9] | AC Coer. force (Oe) | AC Core loss watts/lb |
|---|---|---|---|---|---|---|---|---|
| Comp. Ex. 6 | A 1000C | N/A | $H_3PO_4$ | PEI | 210 | 4.7 | 4.7 | 5.5 |
| Comp. Ex. 7 | A 1000C | N/A | $H_3PO_4$ | CPN-5 | 130 | 4.1 | 4.5 | 4.6 |
| Ex. 8 | A 1000C | 1200 | none | CPN-5 | 325 | 2.1 | 4.6 | 4.8 |
| Ex. 9 | A 1000C | 1200 | $H_3PO_4$ | CPN-5 | 150 | 1.9 | 3.0 | 2.9 |
| Ex. 10 | Coarse Fe | 1200 | $H_3PO_4$ | CPN-5 | 170 | 1.8 | 2.0 | 3.1 |
| Ex. 11 | Fe Alloy | 1200 | $H_3PO_4$ | CPN-5 | 180 | 3.0 | 4.0 | 5.0 |
| Ex. 12 | A 1000C | 1200 | Ca/Zn/$PO_4$[10] | CPN-5 | 150 | 1.8 | 2.3 | 3.5 |

[5]Example Number, "Comp. Ex." is a comparative example.
[6]Annealing temperature; N/A means component was not annealed.
[7]Preinsulating material applied to form inner coating.
[8]Insulating material applied as outer coating; "PEI" is a polyetherimide; "CPN-5" is FERROTECH ™ CPN-5.
[9]"Coer." is Coercive.
[10]Calcium Zinc Phosphate solution.

The results in Table 2 (Examples 8 to 12) demonstrate that the annealable insulated particles of the present invention can be formed into annealed magnetic core components suitable for use in DC and/or AC operating conditions. For example, the annealed magnetic core component of Example 8, containing no inner coating of preinsulating material, was particularly effective for DC applications, exhibiting the highest DC permeability for the samples tested in Table 2. The annealed magnetic components in Examples 9 through 12, containing an inner coating of iron phosphate, were particularly effective for AC operating conditions because of the particularly low AC coercive forces and AC core losses obtained. In comparison, the magnetic core components that were not annealed in accordance with the methods of the present invention (Comparative Examples 6 and Example 7) did not perform as well as the annealed magnetic core components prepared in accordance with the present invention with respect to DC permeability, DC coercive force, AC coercive force, and AC core loss.

EXAMPLE 13

Magnetic toroids were prepared according to the procedure in Example 9, except that the toroids were annealed at temperatures ranging from 300° F. (148° C.) to 1200° F. (684° C.). In each case the toroid was annealed by heating the toroid in an atmosphere of nitrogen to the desired temperature, and maintaining the toroid at these conditions for one hour. The magnetic toroids were then evaluated to obtain the AC permeability, AC coercive force, and the AC core loss at 60 Hz.

Figure 2:
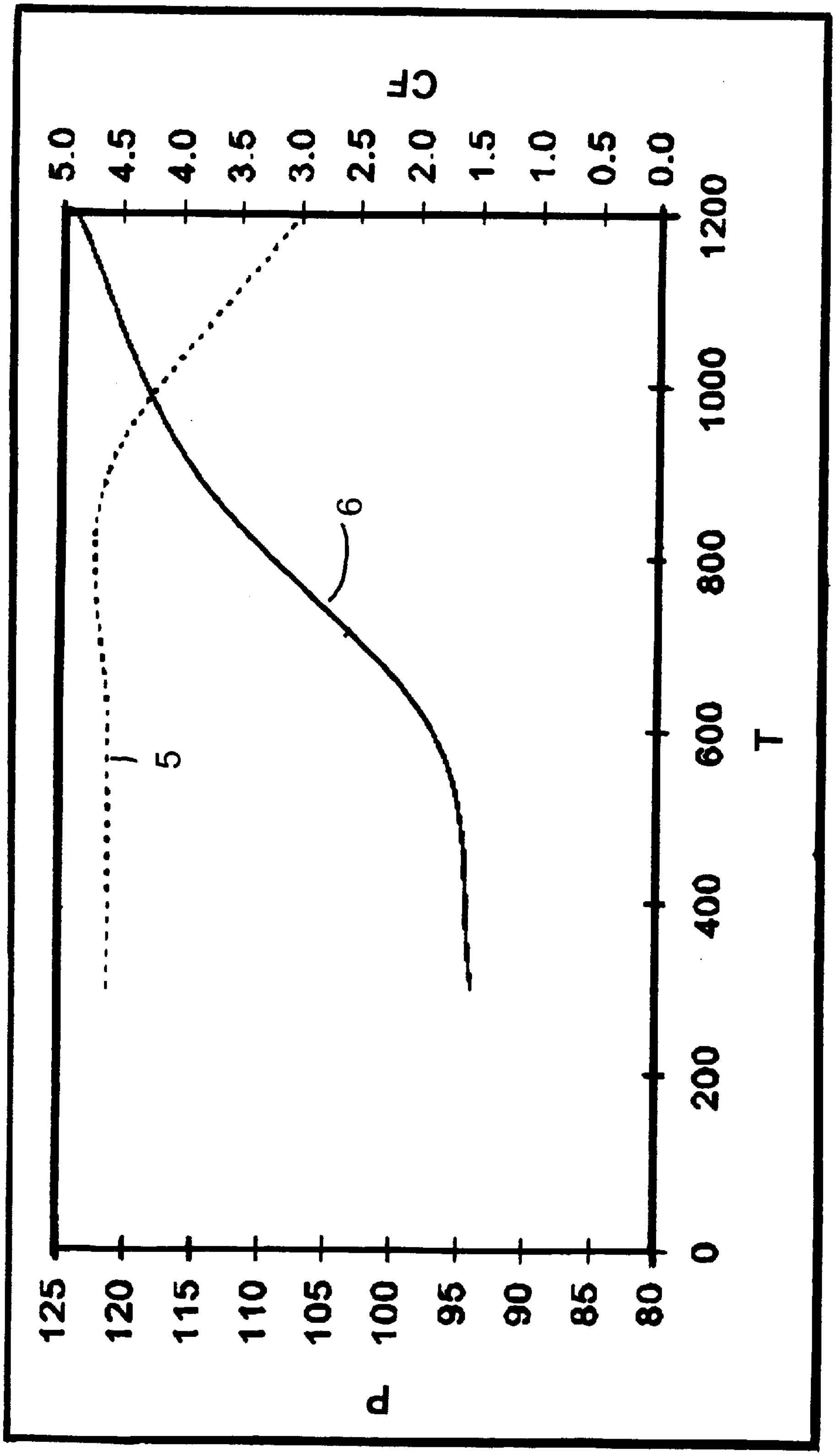
FIG. 2 is a graph showing the effect of annealing temperature (T) on coercive force (axis labeled "CF," Line 5) and permeability (axis labeled "P," Line 6).

The results are reported in FIGS. 1 and 2. FIG. 1 shows the effect of annealing temperature on core loss (in watts per pound, Y-axis) as the maximum magnetic induction (in kiloGauss, X-axis) is varied. Lines 1 through 4 in FIG. 1 represent the magnetic performance of the toroids annealed at different temperatures, where in Line 1 the toroids were annealed at 300° F. (148° C.), Line 2 the toroids were annealed at 600° F. (315° C.), Line 3 the toroids were annealed at 900° F. (482° C.), and Line 4 the toroids were annealed at 1200° F. (684° C.). As can be seen in FIG. 1, as the annealing temperature is increased, the core loss is reduced at a given maximum magnetic induction.

FIG. 2 shows the effect of annealing temperature (T axis) on coercive force (CF axis) and permeability (P axis). Particularly, Line 5 shows the effect of annealing temperature on coercive force, and Line 6 shows the effect of annealing temperature on permeability. As can be seen In FIG. 2, coercive force begins to significantly decrease around a temperature of about 900° F. (482° C.). The permeability begins to significantly increase at about an annealing temperature of 700° F. (371° C.).

There have thus been described certain preferred embodiments of annealable insulated iron particles and methods of making and using the same. While preferred embodiments have been disclosed and described, it will be recognized by those with skill in the art that variations and modifications are within the true spirit and scope of the invention. The appended claims are intended to cover all such variations and modifications.

What is claimed is:

1. Annealable, insulated metal-based powder particles for forming compacted core components comprising:

(a) at least about 80 weight percent, based on the weight of the annealable, insulated metal-based poweder particles, metal-based core particles, wherein the metal-based core particles have outer surfaces;

(b) about 0.001 percent by weight to about 15 percent by weight, based on the weight of the metal-based core particles, of a layer of an annealable insulating material surrounding the metal-based core particles, wherein the annealable insulating material comprises at least one organic polymeric resin, and at least one inorganic compound that is converted to a substantially continuous and nonporous insulating layer that circumferentially surrounds each of the metal-based particles upon heating after compaction; and (c) an inner layer of a preinsulating material located between the outer surfaces of the metal-based core particles and the layer of the annealable insulating material, wherein the preinsulating material comprises up to about 0.5 percent by weight, based on the weight of the metal-based core particles.

2. The annealable insulated metal-based powder particles of claim 1 wherein the layer of preinsulating material is a phosphorus-iron reaction product.

3. The annealable insulated metal-based powder particles of claim 2 wherein the layer of preinsulating material is a hydrated iron phosphate or iron phosphate.

4. The annealable insulated metal-based powder particles of claim 1 wherein the inorganic compound converts at a temperature of at least about 480° C. to form the insulating layer.

5. The annealable insulated metal-based powder particles of claim 4 wherein the inorganic compound converts at a temperature of less than about 800° C. and is selected from the group consisting of alkali metals, alkaline earth metals, nonmetals, transition metals, and combinations thereof.

6. The annealable insulated metal-based powder particles of claim 1 wherein the inorganic compound is selected from the group consisting of $Na_2CO_3$, CaO, $BaO_2$, $Ba(NO_3)_2$, $B_2O_3$, $SiO_2$, $CdCl_2$, $Al_2O_3$ and combinations thereof.

7. The annealable insulated metal-based powder particles of claim 6 wherein the inorganic compound comprises $BaO_2$ and $B_2O_3$.

8. The annealable insulated metal-based powder particles of claim 1 wherein the organic polymeric resin is selected from the group consisting of alkyd, acrylic, and epoxy resins, and combinations thereof.

9. An annealable, insulated powder composition for forming compacted core components, comprising:

(a) at least about 80 weight percent, based on the weight of the annealable, insulated powder composition, metal-based core particles having outer surfaces; and (b) about 0.001 percent by weight to about 15 percent by weight, based on the weight of the metal-based core particles, of a substantially uniform layer of an annealable insulating material surrounding the metal-based core particles, wherein the annealable insulating material comprises at least one organic polymeric resin, and at least one inorganic compound that is converted to a substantially continuous and nonporous insulating layer that circumferentially surrounds each of the metal-based particles upon heating after compaction;

wherein the inorganic compound of the annealable insulating material is substantially uniformly suspended within the organic polymeric resin of the annealable insulating material.

10. The annealable insulated powder composition of claim 9 wherein the composition further comprises up to about 0.5 percent by weight, based on the weight of the metal-based core particles, of an inner layer of a preinsulating material located between the outer surfaces of the metal-based core particles and the layer of the annealable insulating material.

11. The annealable insulated powder composition of claim 10 wherein the layer of preinsulating material is a phosphorus-iron reaction product.

12. The annealable insulated powder composition of claim 11 wherein the layer of preinsulating material is a hydrated iron phosphate or iron phosphate.

13. The annealable insulated powder composition of claim 9 wherein the inorganic compound converts at a temperature of at least about 480° C. to form the insulating layer.

14. The annealable insulated powder composition of claim 13 wherein the inorganic compound converts at a temperature of less than about 800° C. and is selected from the group consisting of alkali metals, alkaline earth metals, nonmetals, transition metals, and combinations thereof.

15. The annealable insulated powder composition of claim 9 wherein the inorganic compound is selected from the group consisting of $Na_2CO_3$, CaO, $BaO_2$, $Ba(NO_3)_2$, $B_2O_3$, $SiO_2$, $CdCl_2$, $Al_2O_3$ and combinations thereof.

16. The annealable insulated powder composition of claim 9 wherein the inorganic compound comprises $BaO_2$ and $B_2O_3$.

17. The annealable insulated powder composition of claim 9 wherein the organic polymeric resin is selected from the group consisting of alkyd, acrylic, and epoxy resins, and combinations thereof.

* * * * *